Sept. 4, 1934.  R. J. NORTON  1,972,235
BRAKE MEMBER
Filed April 18, 1930
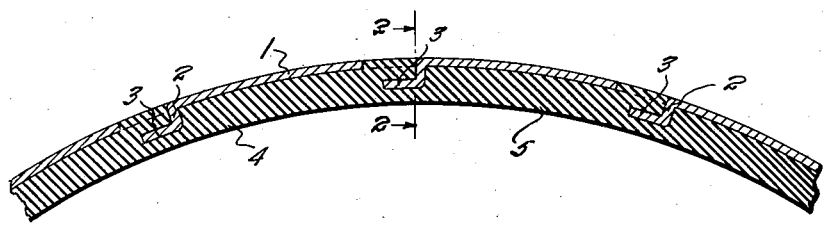
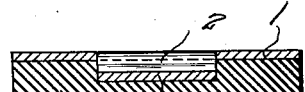
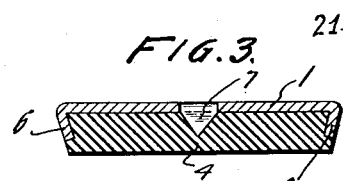
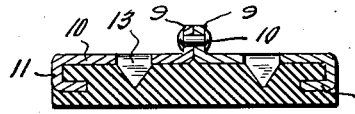
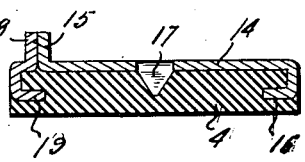
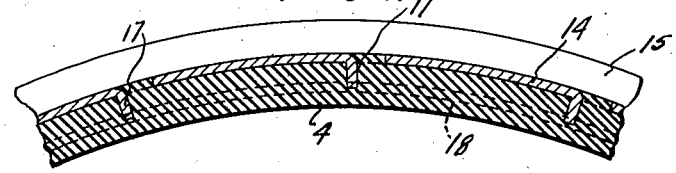
Inventor
RAYMOND J. NORTON
By M. W. McConkey,
Semmes & Semmes
Attorneys Patented Sept. 4, 1934

1,972,235

UNITED STATES PATENT OFFICE 1,972,235

BRAKE MEMBER

Raymond J. Norton, Washington, D. C., assignor to Bendix Brake Company, South Bend, Ind., a corporation of Illinois Application April 18, 1930, Serial No. 445,508

3 Claims. (Cl. 188—218)

This invention relates to improvements in brake members and is a continuation in part of prior application Serial No. 324,362, filed December 7, 1928, now Patent No. 1,781,074, issued November 11, 1930.

The usual type of brake apparatus employed both on automotive vehicles and airplanes, comprises a drum fixed to a wheel and adapted to rotate therewith, and an associated non-rotatable member adapted to be forced, by a suitable expanding mechanism, into contact with the rotating drum. The non-rotating member is either an internal expanding shoe or an external strap. Intermediate the metallic rotatable and non-rotatable members is positioned a friction facing. In the greater majority of brake assemblages, this friction facing is attached to the shoe or strap by means of rivets.

The present invention relates to a novel type of drum in which a special friction material is employed which is permanently associated with the drum by molding it thereon so as to provide a composite structure.

More specifically, the invention comprehends the idea of molding a resinoid directly on the drum so as to provide the friction facing as an integral part thereof. Such a structure presents a number of advantages. In the first place, the resinoid facing forms an integral part of the drum and to this extent facilitates the whole problem of relining, inasmuch as it is necessary only to replace the entire drum structure without disturbing the mounting of the shoes. In the second place, the resinoid friction facing being mounted on the rotating member is subjected to the effective cooling effects of convection currents induced by rotation of the drum. This is of peculiar importance in the case of resinous friction material. These materials have a low coefficient of heat conductivity and are, practically speaking, substantially insulators. Furthermore, due to their chemical composition, they can not withstand very high temperatures. When heated to temperatures of the order of 200° C. laminated resinoid material tends to blister at the surface. When the temperature is raised between 200° and 400° C., the material tends to crack or seam. A third stage in the decomposition occurs in the neighborhood of 500° C., at which stage the material smokes and chars and gives off phenol.

When such materials are used as friction materials and mounted on the shoe, the problem of cooling is difficult. With the present arrangement, however, the potential cooling effect of a rotating metallic member, such as a drum, is availed of.

In order to make the invention more readily understood, there is shown in the accompanying drawing illustrative embodiments thereof.

In the drawing the same reference numerals apply to parts of the several views of which—

Figure 1 is a longitudinal section of a segment of the brake drum, showing the resinoid friction material moulded directly on the metal.

Figure 2 is a cross section taken on the line 2—2 of Figure 1.

Figure 3 is a transverse section of a modified preferred form of drum.

Figure 4 is a view similar to Figure 3 of yet another type of composite metallo-resinoid drum.

Figures 5 and 6 are cross sectional views of a modified type of drum in which the circumferential flange of the drum is made up of two parts.

Figure 7 is a longitudinal section of the device shown in Figure 6.

Figure 8 is a vertical section through a brake drum formed in accordance with the modification shown in Figure 3.

As indicated hereinbefore, the invention comprehends the concept of applying a resinoid friction material directly to the drum member of a brake assemblage, and preferably to mould this friction material directly on the drum.

Heretofore there have been proposed friction linings of the phenol methylene type. The material used in the present invention may be any such resins or any similar resinoids, such, for example, as the urea, acetylene, or furfural resins.

As a typical example of the material to be used, a furfural mouldable resinoid will be described.

Friction materials may be made up by reacting furfural or a derivative of furfural with a suitable phenol derivative in the presence of an accelerator, as, for example, hydrochloric acid. The physical characteristics of the condensation product, as is known, may be varied by adjustments of the thermal conditions of the reaction, and by the application of pressures. Depending upon the conditions under which the reaction is effected, the resulting composition may comprise a resinoid which is relatively soft, like many natural resins, or one which is hard and infusible. The resin which is employed may be compounded with any desired type of filler material, such as short asbestos fibers, etc. To improve the thermal characteristics of the material, modifying agents such as mica may be incorporated. The fibrous material may be incorporated with the resin while it is still in the plastic condition and may be thereafter allowed to solidify and thereafter the composite material moulded in place on the drum.

After mixing the filler material with the fusible condensation product, it may be placed in the brake drum. In this operation, the brake drum itself serves as the mould, which receives the plastic resin product.

The actual processes of making up the fusible and infusible forms of the enumerated resins are well known to those skilled in the art. The fusible form of a furfural condensation product may be prepared by reacting phenol or equivalent substances such as cresol, resorcinal, etc., with furfural or a furfural derivative and a condensing agent such as hydrochloric acid. The quantity of furfural or the hardening agent is chosen as insufficient to cause the formation of the infusible product. In carrying out the first step of the reaction, 100 parts, more or less, of phenol may be reacted with from 20 to 40 parts of furfural and approximately 10 parts of acid.

During the subsequent reaction, water is liberated and a considerable amount of heat generated. As is well known, it is desirable to cool the reaction vessel so as to maintain a temperature of approximately 200° F. After reaction the mass may be heated to expel the water and acid and then distilled to remove the excess of the phenolic constituent. Any residual acid may be neutralized with an alkali. The fusible product mass may then be dissolved in any suitable solvent such as alcohol, acetone, etc., and additional quantities of a hardening agent such as furfuramid, furfural and ammonia, hexamethylenetetramine, etc., may be added. This potentially reactive composition may be used, as explained, to impregnate or be mixed with fillers such as loose fibers of asbestos or other suitable fibrous material and with or without a friction modifying material.

After this treatment, the mass may be placed in a mould and transformed to the infusible form by the continued application of heat at temperatures ranging from 200 to 350° F., or by the application of heat and pressure.

In making up the novel drum according to the present disclosure, a portion of the mould may be constituted by the metallic part of the drum so that the resinoid is moulded directly on the member with which it is to be used. While the foregoing treatment has been indicated, it is to be understood that this is merely given as an example of any desired treatment by which the resinoid may be moulded directly on the metallic member.

In order to insure a strong bond between the metal of the drum and the resin, interlocking structure is provided. This is necessary because of the fact that the resinoid does not, strictly speaking, adhere to the metal.

It will be appreciated that with this concept in mind, a number of specific designs of the metal drum may be employed. Those shown in the drawing and about to be described are indicative of any such types as will subserve the functions herein described and secure the desired results.

As shown in the drawing, the metallo-resinoid drum may comprise a steel stamping having the continuous circumferential flange 1. This flange is continuous with the drum head which may be apertured in the usual manner to permit attachment to a vehicle wheel. If desired, the drum flange 1 may be integrally formed or detachably connected with a disk wheel. In forming the drum, the circumferential flange is punched out to provide a locking member for the resin. As shown in Figure 1, this punched out portion may be so formed as to present the vertical flange 2 and circumferentially extending flange 3. It will be observed that when the resinoid 4 is moulded directly in contact with the drum, the resin material substantially completely incloses both the vertical and circumferential sections of the punched out portion. With this type of structure, the circumferential flange 3 effectively locks the resinoid against radial or vertical movement with respect to the drum and the vertical flange 2 locks the two members against relative circumferential movement.

As shown in Figure 2, the punched out portion may be relatively elongated in a lateral direction, so as to present a wide bearing or abutment surface for the resin. After the fusible material has been placed in contact with the metal flange 1, so that the projections 2 and 3 are completely inclosed with the resin and is then treated to render it infusible, the resulting product comprises an integral metallo-resinoid drum.

Due to the ease and accuracy of moulding these plastic products, the friction-engaging surface of the resin (designated by the numeral 5) is a truly circular surface. This is particularly advantageous inasmuch as it insures increased efficiency of the brake structure. If desired, however, advantage may be taken of the machinability of such resinoids to grind down the friction surface to any desired curvature.

As noted above, other specific forms of composite metal resin drums may be used. An example of such a modification is shown in Figures 3 and 8. In this structure, the circumferential or braking flange 1 is provided with one or more downwardly and inwardly extending terminal portions 6. The upper face of the drum may be punched out to form the pointed projection 7. It will be observed that in this modification, the downwardly extending metallic section 7 effectively locks the metal drum and the resinoid friction material against relative circumferential movement, while the inturned edge 6 presents a type of dove-tail lock which prevents relative radial movement of the two members. The section 6, as will be understood, may extend continuously throughout the circumference of the brake band, as shown in Figure 8, or may constitute only indentations around the circumferential surface. As shown in Figure 8, the drum head member 21 is apertured at 22 in the usual manner, and is provided with a peripheral flange 24 which may be secured to the braking flange 1 by spot welding or other suitable means, as indicated at 26.

Yet another type of structure which may be employed is disclosed in Figure 4. In this modification, the circumferential flange 1 is provided with the radially extending projections 7 in much the same manner as the structure shown in Figure 3. In this modification, radial movement of the friction material is prevented by means of the laterally extending flanges 8. These may be formed up from the metal of the circumferential flange so as to provide a substantially U-shaped lock for the friction material. The projections 8 may be spaced around the circumferential surface of the drum or may constitute a continuous circumferential flange. Or again, the projections 8 may constitute a continuous circumferential flange at the open face of the drum and separate or segregated sections on the inner or closed face of the drum. Where the latter structure is employed, the friction material 5 may be made of sufficient depth to seal off the aperture in the drum head, resulting from the displacement of the projection 8. As in the structure shown in Figure 3, the drum head has been omitted for the sake of clarity. It will be understood, however, that this extends continuously from the brake flange 1.

If desired, the metallic section of the metallo-resinoid drum may be made up of a plurality of stampings, examples of which are shown in Figures 5 and 6. In Figure 5, the drum flange may comprise two stampings having the vertical flanges 9 placed back to back and rigidly secured together, as, for example, by the rivets 10. In place of the rivets, any other suitable means of securement may be utilized, as, for example, by spot or seam welding. From the flanges 9, the metal of the stamping extends laterally as the braking flange 10. At its outer edge, this flange extends downwardly as a circumferential section 11 and then inwardly as a terminal flange 12. One or both of the stampings may be formed with inwardly extending integral lugs 13. As noted hereinbefore, the lugs 13 engage or are surrounded by the resin so as to prevent relative circumferential movement of the resin and the metal flange while the projections 12 effectively lock the two against relative radial movement.

Another form of structure which may be made up is shown in Figure 6. In such a modification, the braking flange 14 is upturned at its outer edge to present a terminal flange 15. At its inner edge, it extends downwardly to form the drum head and at spaced sections adjacent the periphery of the drum head the portions 16 are stamped or punched out to provide circumferential locking projections. The braking flange, as in other modificatiins, may be punched out to provide the vertical projection 17. At the open face of the drum, a rim-locking flange is provided. This comprises a vertical flange 18, preferably of the same height as flange 15, and integrally secured thereto by any suitable means as, for example, by a fusion joint. The flange 18 is extended downwardly and then inwardly to provide the terminal retaining flange 19, the function of which is the same as elements 3, 6, 8, and 12, described hereinbefore.

It will be seen that in all of the modifications described, the metal of the brake drum is so designed and formed as to provide members which, so to speak, interlock with the moulded plastic so as to provide for a composite structure. These specific modifications are given merely as examples of any other specific structures which embody the described principles and which eventuate in a similar article. It will be obvious that the shape, design, and construction of the metallic members may be widely varied to accomplish the stated results. Any and all such modifications are considered to be comprehended within the scope of the present disclosure.

It will be understood, also, that a wide range of modifications of the friction material is available. For example, this material may be so made up as to provide zones of relative fusible and infusible material, as is described in co-pending application Serial No. 324,362, filed December 7, 1928, now Patent No. 1,781,074 issued November 11, 1930. Furthermore, if desired, the resin which is employed may have incorporated therein, adjacent the friction surface lubricating media so as to modify the coefficient of friction, such as is described in copending application Serial No. 361,013, filed May 6, 1929, now Patent No. 1,788,319 issued January 6, 1931.

Therefore, while certain types of structure have been described, it is to be understood that these are given purely by way of example and merely as illustrative of the broad concept of the invention which is considered to reside in the provision of a composite metallo-resin drum.

I claim:

1. A brake drum comprising separate metal parts secured together and a friction material moulded between tne parts.

2. A brake drum comprising separate metal parts, means including circumferentially extending flanges on one side of said parts for securing said parts together, and a friction facing material held between the parts on the opposite side thereof.

3. A brake drum comprising two pressed metal parts, both of said parts being provided with radial and circumferential projections, and a resinoid liner held between said parts.

RAYMOND J. NORTON.